US012434459B2

(12) United States Patent
Nair et al.

(10) Patent No.: US 12,434,459 B2
(45) Date of Patent: Oct. 7, 2025

(54) BARRIER LAMINATE AND IMPLEMENTATIONS THEREOF

(71) Applicant: Hariharan Krishnan Nair, Mumbai (IN)

(72) Inventors: Hariharan Krishnan Nair, Mumbai (IN); Gurunath Pozhal Vengu, Bangalore (IN)

(73) Assignee: Hariharan Kirshnan NAIR, Mumbai (IN)

( * ) Notice: Subject to any disclaimer, the term of this patent is extended or adjusted under 35 U.S.C. 154(b) by 1 day.

(21) Appl. No.: 17/875,213

(22) Filed: Jul. 27, 2022

(65) Prior Publication Data

US 2022/0363041 A1   Nov. 17, 2022

Related U.S. Application Data

(63) Continuation of application No. PCT/IN2021/050952, filed on Oct. 1, 2021.

(30) Foreign Application Priority Data

Oct. 1, 2020  (IN) .............................. 202021042871

(51) Int. Cl.
| | | |
|---|---|---|
| B32B 27/08 | (2006.01) | |
| B32B 1/08 | (2006.01) | |
| B32B 7/12 | (2006.01) | |
| B32B 27/32 | (2006.01) | |
| B32B 37/12 | (2006.01) | |
| B32B 37/24 | (2006.01) | |

(52) U.S. Cl.
CPC ............... *B32B 27/08* (2013.01); *B32B 1/08* (2013.01); *B32B 7/12* (2013.01); *B32B 27/32* (2013.01); *B32B 37/12* (2013.01); *B32B 37/24* (2013.01); *B32B 2037/243* (2013.01); *B32B 2250/242* (2013.01); *B32B 2255/10* (2013.01); *B32B 2255/26* (2013.01); *B32B 2255/28* (2013.01); *B32B 2270/00* (2013.01); *B32B 2307/72* (2013.01); *B32B 2307/7244* (2013.01); *B32B 2307/732* (2013.01); *B32B 2323/043* (2013.01); *B32B 2323/046* (2013.01); *B32B 2329/04* (2013.01); *B32B 2375/00* (2013.01); *B32B 2439/40* (2013.01); *B32B 2553/00* (2013.01)

(58) Field of Classification Search
None
See application file for complete search history.

(56) References Cited

U.S. PATENT DOCUMENTS

| | | | |
|---|---|---|---|
| 4,254,169 A | 3/1981 | Schroeder | |
| 4,363,840 A | 12/1982 | Roullet et al. | |
| 4,416,938 A | 11/1983 | Haskell | |
| 4,544,698 A | 10/1985 | Roullet et al. | |
| 5,549,943 A | 8/1996 | Vicik | |
| 6,068,933 A | 5/2000 | Shepard et al. | |
| 6,562,476 B2 | 5/2003 | Shepard et al. | |
| 6,699,549 B1 | 3/2004 | Ueyama et al. | |
| 6,720,046 B2 | 4/2004 | Schwartz et al. | |
| 7,794,848 B2 | 9/2010 | Breese | |
| 9,662,863 B2 * | 5/2017 | Lorenzetti | B29C 48/18 |
| 11,518,151 B2 * | 12/2022 | Nair | B65D 65/40 |
| 2002/0155308 A1 * | 10/2002 | Heffelfinger | B32B 27/32 |
| | | | 428/483 |
| 2012/0100356 A1 | 4/2012 | Ohlsson et al. | |
| 2014/0199505 A1 | 7/2014 | Lorenzetti et al. | |
| 2015/0158235 A1 * | 6/2015 | Van Loon | B32B 27/32 |
| | | | 428/218 |
| 2016/0200080 A1 | 7/2016 | Muslet et al. | |
| 2018/0281365 A1 | 10/2018 | Moffitt | |
| 2019/0010307 A1 | 1/2019 | King, III et al. | |
| 2022/0097349 A1 | 3/2022 | Nair et al. | |

FOREIGN PATENT DOCUMENTS

| | | |
|---|---|---|
| CN | 1649728 A | 8/2005 |
| CN | 1649729 A | 8/2005 |
| CN | 210362753 U | 4/2020 |
| EP | 3446870 A1 | 2/2019 |
| WO | WO 9423941 A1 | 10/1994 |
| WO | WO 0016977 A1 | 3/2000 |
| WO | WO 02060625 A2 | 8/2002 |
| WO | WO 02072347 A2 | 9/2002 |
| WO | 03/082568 A1 | 10/2003 |
| WO | 03/093009 A2 | 11/2003 |
| WO | WO 2012020426 A1 | 2/2012 |

OTHER PUBLICATIONS

European Search Report, mailed May 23, 2022, for European Patent Application No. 20870475.9. (6 pages.).
International Search Report, mailed Sep. 21, 2020, for International Application No. PCT/IN2020/050530. (5 pages.).
Guiles Jr., et al., "Extrusion: The Definitive Processing Guide and Handbook: 31 Troubleshooting Blown Film," William Andrew, Inc., Norwich, NY, USA, 2005, pp. 301-306.

(Continued)

*Primary Examiner* — Sheeba Ahmed
(74) *Attorney, Agent, or Firm* — Seed Intellectual Property Law Group LLP (57) ABSTRACT

The present disclosure provides a barrier laminate (F) comprising: a) at least one polyolefin core layer (X); b) at least one barrier layer (Y) joined to both the sides of the at least one polyolefin core layer (X); and c) at least one polyolefin layer (Z) adjacent to the at least one barrier layer (Y), wherein the at least one barrier layer is a polyvinyl alcohol (PVOH) coating layer on one side of the at least one polyolefin core layer (X) and has a coating thickness in the range of 0.1 gsm-1.5 gsm. The present disclosure also provides a process for preparing the barrier laminate.

24 Claims, 2 Drawing Sheets

(56) References Cited

OTHER PUBLICATIONS

Indian Examination Report, dated Sep. 18, 2020, for Indian Patent Application No. 201921051881. (7 pages) (with English translation).
Wolf, "A Technology Decision-Adhesive Lamination or Extrusion Coating/Lamination?", Tappi Place Conference, Albuquerque, NM, USA, Apr. 18-21, 2010. (26 pages).
Chen et al., "Structure Evolution and Deformation Behavior of Polyethylene Film during Biaxial Stretching", *ACS Omega* 2020 5 (1): 655-666, Dec. 27, 2019. (12 pages).
Nitta et al., "Three dimensional molecular orientation of isotactic polypropylene films under biaxial deformation at higher temperatures", *Polymer* 74 (2015): 30-37, Jul. 29, 2015. (8 pages).
Eric Hatfield, "11—Machine Direction-Oriented Film Technology," in Wagner (ed), *Multilayer Flexible Packaging* (Second Edition) (2016): 147-172. (26 pages).
Barry A. Morris, "11 - Thermoforming, Orientation, and Shrink," *The Science and Technology of Flexible Packaging: Multilayer Films from Resin and Process to End Use*, (2017): 411-413. (3 pages).

\* cited by examiner

BARRIER LAMINATE AND IMPLEMENTATIONS THEREOF

TECHNICAL FIELD OF THE INVENTION

The present invention relates to a barrier laminate for packaging comprising multi-layers. It also relates to a process of manufacturing such a barrier laminate. It further relates to an article comprising the barrier laminate. Furthermore, the present invention relates to the use of the barrier laminate in an article/packaging material.

BACKGROUND OF THE INVENTION

The primary function of a package is to shield the product, and it is through this function society derives the most benefit by preventing the product inside the package, thereby extending the life of a product, be it food, cosmetics, hygiene products, or health care products. Packaging has evolved to meet the changing needs of the value chain, for example, packaging in modern times increasingly serves as a communication platform, providing content information, instruction, and a marketing message apart from shielding the products from air, moisture, and oxygen.

For numerous food packaging, the barrier properties, in terms of oxygen and flavor/odor, are particularly vital criteria to ensure that the required minimum shelf-life is attained. Typically, various materials like ethylene vinyl alcohol (EVOH), polyvinyl alcohol (PVOH), polyethylene terephthalate (PET), etc. are used to attain required barrier properties. These materials in the form of film or coating often are used in combination with other materials like polyolefins to get the necessary properties for packaging a product. Among the aforementioned materials, polyvinyl alcohol (PVOH) provides enhanced oxygen and flavor/odor barrier characteristics. However, PVOH is soluble in water and, as a result, susceptible to attack by moisture. It is known that the oxygen and flavor/odor permeability of PVOH coatings increases in proportion to its moisture content.

Various barrier films/laminates comprising PVOH are available. U.S. Pat. No. 4,544,698 discloses coating thermoplastic material, e.g., polyolefins, polyamides, polyesters, with an aqueous solution of polyvinyl alcohol and a water insensitive polymer latex. The implication of the disclosure appears to be that for polyvinyl alcohol alone the gas permeability increases in proportion to its moisture content, and stains due to moisture. Coating thicknesses, of the polyvinyl alcohol and polymer latex layers, of 2.9-4.3 μm are exemplified, giving oxygen permeabilities of between 0.8 and 2 $cm^2 \cdot s^{-1} \cdot cm\ Hg^{-10} \times 10^{12}$, at 45 percent relative humidity and 40° C. temperature.

U.S. Pat. No. 4,416,938 discloses a transparent gas barrier, for retortable pouches made from dialdehyde-treated polyvinyl alcohol. The disclosure indicates that films made from polyvinyl alcohol, chemically hardened or not, have been used in packaging materials but have been found to exhibit moisture sensitivity inconsistent with good barrier properties. This problem is overcome by using a coating composition comprising a homogenous combination of metal orthophosphate and dialdehyde treated polyvinyl alcohol.

U.S. Pat. No. 4,363,840 provides moisture resistance in polyvinyl alcohol films by forming a coating composition of a two-phase structure of a fine dispersion of polyvinyl alcohol occluded in a water-insensitive polymer or matrix that is incompatible with the polyvinyl alcohol.

U.S. Pat. No. 4,254,169 describes the "sandwiching" of a vapor barrier polyvinyl alcohol film between water resistant protective layers.

In the above references, the gas barrier layer is in the form of a film or a part of co-extrusion. The thickness of each gas barrier layers is such that it usually affects the physical properties of the structure, e.g., flex crack resistance, impact resistance. The gas barrier properties could be attained with significantly thinner layers of polyvinyl alcohol or ethylene vinyl alcohol copolymer, but such thin coextrusions or films thereof tend to pinhole, thus making such an approach impractical. Coating a base film with a thin coating of such gas barrier materials would provide the necessary gas barrier properties while essentially maintaining the structural properties of the base film. Heretofore polyvinyl alcohol, applied as a coating from solution or dispersion, but various problems are associated with the direct application of wet polyvinyl alcohol on films, such as nylon, i.e. the bond between the gas barrier layer and the base layer seems to disintegrate when the film/laminate composite is subjected to moisture. The moisture may act to cause staining or wear due to friction, an unpleasant feel to the touch and a dull appearance.

Although PVOH gives the lowest oxygen transmission rate for a given thickness but PVOH is not generally considered to be thermoformable or melt-processable. When starting with just polyvinyl alcohol the resulting laminates have inadequate resistance to water, and it is not possible to produce thick coatings on an industrially advantageous level. Thus, there remains a thickness limit (gsm) beyond which coating becomes brittle and is industrially disadvantageous.

It is, therefore, the object of the present disclosure to provide barrier laminate with enhanced barrier efficiency within the industrially advantageous thickness limits.

SUMMARY OF THE INVENTION

In an aspect of the present disclosure, there is provided a barrier laminate (F) comprising: (a) at least one polyolefin core layer (X); (b) at least one barrier layer (Y) joined to both the sides of the at least one polyolefin core layer (X); and (c) at least one polyethylene layer (Z) adjacent to the at least one barrier layer (Y), wherein the at least one barrier layer is a polyvinyl alcohol (PVOH) adhesive coating layer on one side of the at least one polyolefin core layer (X) and has a coating thickness in the range of 0.1 gsm-1.5 gsm.

In another aspect of the present disclosure, there is provided a process of preparing the barrier laminate as disclosed herein, wherein the laminate is prepared by a process selected from blown film process, cast film process, and extrusion lamination and/or adhesive lamination of blown or cast films.

In yet another aspect of the present disclosure, there is provided an article comprising the barrier laminate as disclosed herein.

In a further aspect of the present disclosure, there is provided a use of the barrier laminate as described herein for packaging material.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The phrase "at least one polyolefin core layer (X)" refers to any polyethylene selected from the group consisting of high density polyethylene, medium density polyethylene, low density polyethylene, linear low density polyethylene, polypropylene, propylene copolymers, ethylene copolymers, polymethyl pentene, and combinations thereof.

The phrase "at least one polyolefin core layer (X)" also refers to any polyethylene selected from the group consisting of high density polyethylene, medium density polyethylene, linear low density polyethylene, polypropylene, propylene copolymers, ethylene copolymers, polymethyl pentene, and combinations thereof.

The phrase "at least one polyolefin layer (Z)" refers to any polyethylene selected from the group consisting of high density polyethylene, medium density polyethylene, low density polyethylene, linear low density polyethylene, polypropylene, propylene copolymers, ethylene copolymers, polymethyl pentene and combinations thereof.

The phrase "high density polyethylene" as used herein refers to polyethylene having a density usually in the range of from about 0.94 g/cm$^3$ to about 0.99 g/cm$^3$. The term HDPE and high density polyethylene may be interchangeably used. The melt flow index may be in the range of 0.2 to 8 g/10 min, more specifically in the range of 0.2 to 2.0 g/10 min.

The phrase "medium density polyethylene" as used herein refers to polyethylene having a density usually in the range of from about 0.926 g/cm$^3$ to about 0.941 g/cm$^3$. The term MDPE and medium density polyethylene may be interchangeably used.

The phrase "low density polyethylene" as used herein refers to polyethylene having a density usually in the range of from about 0.910 g/cm$^3$ to about 0.925 g/cm$^3$. The term LDPE and low density polyethylene may be interchangeably used.

The phrase "linear low density polyethylene" as used herein refers to polyethylene having a density usually in the range of from about 0.910 g/cm$^3$ to about 0.930 g/cm$^3$. The term LLDPE and linear low density polyethylene may be interchangeably used.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of 40 µm to 140 µm should be interpreted to include not only the explicitly recited limits of 40 µm to 140 µm, but also to include sub-ranges, such as 65 µm to 135 µm, 70 µm to 130 µm, and so forth, as well as individual amounts, including fractional amounts, within the specified ranges, such as 39.95 µm, 140.94 µm, for example.

As discussed above, barrier laminate(s) with enhanced barrier properties is the need of the hour. Therefore, to address the need, the present disclosure provides a barrier laminate wherein the structure of the barrier laminate is such that even with reduced thickness of the barrier layer, the barrier properties are surprisingly enhanced, i.e., replacing a single barrier layer of certain thickness with two barrier layers separated by a polyolefin core layer results in a film with enhanced barrier properties. The two barrier layers/coatings separated by an intermediate polyolefin layer gave an unexpectedly very low oxygen transmission rate (OTR). Typically, PVOH coatings joined by an polyurethane adhesive layer gives a value of 0.34 cc/m$^2$·day of OTR, however by using the barrier laminate of the present disclosure the OTR value reduces by at least 2-15 times. A similar effect was observed when PVOH coating was separated by a polyolefin core layer from EVOH barrier layer.

Polyolefin Core Layer

A barrier laminate according to the present disclosure may comprise at least one polyolefin core layer. The polyolefin core layer includes a polymer having density in the range of 0.833 g/cm$^3$-0.99 g/cm$^3$. In an embodiment of the present disclosure, the polyolefin core layer includes a polymer selected from the group consisting of high density polyethylene, medium density polyethylene, low density polyethylene, linear low density polyethylene, polypropylene, propylene copolymers, ethylene copolymers, polymethyl pentene, and combinations thereof. The polyolefin core layer may be a monolayer structure. Alternatively, polyolefin core layer may be a multilayer structure. The thickness of the polyolefin core layer may be in the range of 1-250 μm; particularly 20-200 μm; more particularly 50-150 μm.

In an alternate embodiment of the present disclosure, the polyolefin core layer includes a polymer that may be selected from the group consisting of high density polyethylene, medium density polyethylene, linear low density polyethylene, polypropylene, propylene copolymers, ethylene copolymers, polymethyl pentene, and combinations thereof.

Barrier Layer

A barrier laminate according to the present disclosure comprises at least two barrier layer. The barrier layer may be present on both the sides of the polyolefin core layer. The barrier layer on both the sides of the polyolefin core layer is either PVOH coating or is a combination of PVOH coating and EVOH barrier layer. When the barrier laminate comprises PVOH adhesive coating as the barrier layer, the coating may have thickness in the range of 0.1 gsm-1.5 gsm. When the barrier laminate of the present disclosure comprises EVOH barrier layer, the EVOH barrier layer may be a single layer structure or a multilayer structure. The multilayer structure may comprise at least one polyolefin layer, at least one tie layer, or combinations thereof. The multilayer EVOH barrier layer may have layers varying from 5 layers to 9 layers. The thickness of the multilayer EVOH barrier layer may vary from 20 μm to 150 μm; particularly 40 to 100 μm. The thickness of the EVOH layer in the multilayer EVOH barrier layer may vary from 1 μm to 24 μm. The barrier laminate of the present disclosure comprising the barrier layer as aforementioned prevents permeation of oxygen gas and water vapor through it.

In a barrier laminate of the present disclosure, the polyolefin core layer may be contiguous to and in contact with at least one barrier layer. Alternatively, one or more intermediate layers may be disposed between the polyolefin core layer and the at least one barrier layer. In such a case, the polyolefin core layer will be contiguous to and in contact with an intermediate layer, and the barrier layer will be contiguous to and in contact with the intermediate layer. As will be readily understood, if there is only one intermediate layer disposed between the polyolefin core layer and barrier layer, then the intermediate layer that is contiguous to and in contact with the barrier layer is the same intermediate layer that is contiguous to and in contact with the polyolefin core layer. The intermediate layer in between the polyolefin core layer and at least one barrier layer is at least one adhesive layer. The adhesive may be polyurethane adhesive.

In another embodiment of the present disclosure one or more intermediate layers, may be disposed between the polyolefin layer and the at least one barrier layer. In such a case, the polyolefin layer will be contiguous to and in contact with an intermediate layer, and the barrier layer will be contiguous to and in contact with the intermediate layer. As will be readily understood, if there is only one intermediate layer disposed between the polyolefin layer and barrier layer, then the intermediate layer that is contiguous to and in contact with the barrier layer is the same intermediate layer that is contiguous to and in contact with the polyolefin layer. The intermediate layer in between the polyolefin layer and the barrier layer is at least one primer layer. The primer layer may be polyethylene imine.

Polyvinyl Alcohol Layer

The barrier laminate of the present disclosure may comprise at least one barrier layer. The barrier layer may be a polyvinyl alcohol coating layer. The polyvinyl alcohol coating may have a coating thickness in the range of 0.1 gsm-1.5 gsm. The polyvinyl alcohol coating by means and methods is well known in the art. In a barrier laminate of the present disclosure, the polyvinyl alcohol coating layer may be contiguous to and in contact with at least one polyolefin core layer or at least one polyethylene layer. Alternatively, one or more intermediate layers may be disposed between the polyolefin layer and the polyvinyl alcohol coating layer. The intermediate layer may be an adhesion promoting primer layer that helps in forming strong bond between two unlike layers or an adhesive layer. In a case, the polyolefin layer will be contiguous to and in contact with an intermediate layer, i.e., primer layer, and the polyvinyl alcohol coating layer will be contiguous to and in contact with the intermediate layer, i.e., primer layer. Then again, one or more intermediate layer may be disposed between the polyolefin core layer and the polyvinyl alcohol coating layer. In such a case, the polyolefin core layer will be contiguous to and in contact with an intermediate layer, and the polyvinyl alcohol coating layer will be contiguous to and in contact with an intermediate layer. As will be readily understood, if there is only one intermediate layer disposed between the polyethylene layer/polyolefin core layer and polyvinyl alcohol adhesive layer, then the intermediate layer, i.e., adhesive layer, that is contiguous to and in contact with the poly vinyl alcohol coating layer is the same intermediate layer that is contiguous to and in contact polyethylene core layer. The adhesion promoting primer layer of the present disclosure is polyethylene amine and the adhesive layer may be polyurethane adhesive. The adhesive lamination layer may have a coating thickness in the range of 1 gsm to 6 gsm.

Ethylene Vinyl Alcohol Layer

The barrier layer may be present on both the sides of the polyolefin core layer. The barrier layer on both the sides of the polyolefin core layer is either PVOH coating or is a combination of PVOH coating and EVOH barrier layer. When the barrier laminate of the present disclosure comprises EVOH barrier layer, the EVOH barrier layer may be a single layer structure or a multilayer structure. The multilayer structure may comprise at least one polyolefin layer, at least one tie layer, or combinations thereof. The multilayer EVOH barrier layer may have layers varying from 5 layers to 9 layers. The multilayer EVOH barrier layer may be structure selected, A/T/B/T/A, A/T/B/T/B/T/A, A/T/B/B/B/T/A, A/A/T/B/T/B/T/A/A, A/A/T/B/B/B/T/A/A wherein A is polyolefin layer, T is tie layer, and B is preferably EVOH layer, or could be a combination of nylon, and EVOH. The polyolefin may be a polyethylene selected from very low density polyethylene (VLDPE), low density polyethylene (LDPE), linear low-density polyethylene (LLDPE), medium density polyethylene (MDPE) or high density polyethylene (HDPE). These polyethylene polymers generally have a melt index ranging from 0.2 to 15 g/10 min, preferably 0.5 to 7, more preferably 0.8 to 1.5 as measured by ASTM:

D1238 190.° C. @. 2.16 kg. The thickness of the multilayer EVOH barrier layer may vary from 20 to 150 µm; particularly 40 to 150 µm. The thickness of the EVOH layer in the multilayer EVOH barrier layer may vary from 1 µm to 24 µm. The barrier laminate of the present disclosure comprising the barrier layer as aforementioned prevents permeation of oxygen gas and water vapor through it.

Tie Layer

In the barrier laminate of the present disclosure, at least one tie layer may be present. The at least one tie layer may be selected from the group consisting of maleated polyethylene, anhydride grafted ethylene/1-butene copolymer, anhydride grafted ethylene/1-hexene copolymer, propylene ethylene copolymer, ethylene vinyl acetate copolymer, ethylene methyl acrylate copolymer, and anhydride grafted ethylene/1-octene copolymer. The tie layer may be present in between a polyolefin core layer and a barrier layer or the tie layer may be present in between a polyethylene layer and a barrier layer. The tie layer may be chosen to maximize compatibility with the barrier layer thereon and to maximize adhesion between the barrier layer and polyolefin core layer or polyethylene layer. For example, if the barrier layer comprises, e.g., EVOH, a tie layer comprising a maleic anhydride-grafted or modified polymer may be disposed between the barrier layer and the polyolefin core layer. The tie layer may have a thickness in the range of 2 µm-25 µm.

Polyolefin Layer

The barrier laminate of the present disclosure may comprise at least one polyolefin layer. The polyolefin layer may be present adjacent to the at least one barrier layer. The polyolefin layer may comprise any polyethylene selected from the group consisting of high density polyethylene, medium density polyethylene, low density polyethylene, linear low density polyethylene, polypropylene, propylene copolymers, ethylene copolymers, polymethyl pentene and combinations thereof. These ethylene polymers generally have a density in the range of 0.833 g/cm$^3$-0.990 g/cm$^3$ and melt index ranging 0.2 to 15 g/10 min, preferably 0.5 to 7, more preferably 0.8 to 1.5 as measured by ASTM: D1238 190° C. @ 2.16 kg. The polyolefin layer may have a thickness in the range of 3 µm-200 µm. The polyolefin layer may be a mono layer structure or a multilayer structure. The polyolefin layer may be coextruded with, or extrusion coated, extrusion laminated, or adhesive laminated, by means and methods well known in the art, to the at least one barrier layer. In a barrier laminate of the present disclosure, the polyethylene layer may be contiguous to and in contact with at least one barrier layer.

Primer Layer

A barrier laminate of the present disclosure may comprise at least one primer layer. The primer layers may be disposed between the polyolefin layer and the polyvinyl alcohol coating layer. In such a case, the polyolefin layer will be contiguous to and in contact with a primer layer, and the polyvinyl alcohol coating layer will be contiguous to and in contact with a primer layer. Then again, primer layers may be disposed between the polyolefin core layer and the polyvinyl alcohol coating layer. In such a case, the polyolefin core layer will be contiguous to and in contact with a primer layer, and the polyvinyl alcohol adhesive coating layer will be contiguous to and in contact with a primer layer. As will be readily understood, if there is only one primer layer disposed between the polyolefin layer and polyvinyl alcohol coating layer, then the primer layer that is contiguous to and in contact with the poly vinyl alcohol coating layer is the same primer layer that is contiguous to and in contact with the polyolefin layer. The primer layer of the present disclosure is polyethylene imine (PEI). A PVOH coating which is inclusive of primer layer is also a feasibility.

Adhesive Layer

A barrier laminate of the present disclosure may comprise at least one adhesive layer. The adhesive layers may be disposed between the polyolefin core layer and the polyvinyl alcohol coating layer. In such a case, the polyolefin core layer will be contiguous to and in contact with an adhesive layer, and the polyvinyl alcohol coating layer will be contiguous to and in contact with an adhesive layer. As will be readily understood, if there is only one adhesive layer disposed between the polyolefin core layer and polyvinyl alcohol coating layer, then the adhesive layer that is contiguous to and in contact with the poly vinyl alcohol coating layer is the same adhesive layer that is contiguous to and in contact with the polyolefin core layer. The adhesive layer of the present disclosure is polyurethane adhesive.

Surface-Treatment

The polyethylene layer of the barrier laminate or the polyolefin core layer of the barrier laminate of the present disclosure may be surface-treated on one or both of its outer surfaces to render the surface more receptive to coating or lamination. The surface treatment can be carried out by any method, including, but not limited to, corona discharge treatment, flame treatment, or plasma treatment. Although any of these techniques may be effectively employed, a particularly desirable method of surface-treatment is the so-called corona discharge treatment method, which comprises exposing the layer surface to a high voltage corona discharge while passing the layer between a pair of spaced electrodes.

In an embodiment of the present disclosure, there is provided a barrier laminate (F) comprising: (a) at least one polyolefin core layer (X); (b) at least one barrier layer (Y) joined to both the sides of the at least one polyolefin core layer; and (c) at least one polyolefin layer (Z) adjacent to the at least one barrier layer, wherein the at least one barrier layer is a polyvinyl alcohol (PVOH) adhesive coating layer on one side of the at least one polyolefin core layer (X) and has a coating thickness in the range of 0.1 gsm-1.5 gsm. In an embodiment of the present disclosure, there is provided a barrier film as described herein, wherein the laminate with respect to the core layer can be symmetrical or asymmetrical in-terms of layers.

In an embodiment of the present disclosure, there is provided a barrier laminate (F) comprising: (a) at least one polyolefin core layer (X); (b) at least one barrier layer (Y) joined to both the sides of the at least one polyolefin core layer; and (c) at least one polyolefin layer (Z) adjacent to the at least one barrier layer, wherein the at least one barrier layer is a polyvinyl alcohol (PVOH) coating layer on one side of the at least one polyolefin core layer (X) and has a coating thickness in the range of 0.1 gsm-1.5 gsm, and the at least one barrier layer on second side of core layer (X) may be selected from polyvinyl alcohol coating layer, ethylene vinyl alcohol layer, nylon layer, or combinations thereof.

In an embodiment of the present disclosure, there is provided a barrier laminate (F) comprising: (a) at least one polyolefin core layer (X); (b) at least one barrier layer (Y) joined to both the sides of the at least one polyolefin core layer; and (c) at least one polyolefin layer (Z) adjacent to the at least one barrier layer, wherein the at least one barrier layer is a polyvinyl alcohol (PVOH) coating layer on one side of the at least one polyolefin core layer (X) and has a coating thickness in the range of 0.1 gsm-1.5 gsm, and the at least one barrier layer on second side of core layer (X) is polyvinyl alcohol layer.

In an embodiment of the present disclosure, there is provided a barrier laminate (F) comprising: (a) at least one polyolefin core layer (X); (b) at least one barrier layer (Y) joined to both the sides of the at least one polyolefin core layer; and (c) at least one polyolefin layer (Z) adjacent to the at least one barrier layer, wherein the at least one barrier layer is a polyvinyl alcohol (PVOH) coating layer on one side of the at least one polyolefin core layer (X) and has a coating thickness in the range of 0.1 gsm-1.5 gsm, and the at least one barrier layer on second side of core layer (X) is ethylene vinyl alcohol layer.

In an embodiment of the present disclosure, there is provided a barrier laminate (F) comprising: (a) at least one polyolefin core layer (X); (b) at least one barrier layer (Y) joined to both the sides of the at least one polyolefin core layer; and (c) at least one polyolefin layer (Z) adjacent to the at least one barrier layer, wherein the at least one barrier layer is a polyvinyl alcohol (PVOH) coating layer on one side of the at least one polyolefin core layer (X) and has a coating thickness in the range of 0.1 gsm-1.5 gsm, and the at least one barrier layer on second side of core layer (X) comprises polyvinyl alcohol layer or ethylene vinyl alcohol layer, wherein the ethylene vinyl alcohol layer is a multilayer structure having 5-9 layers.

In an embodiment of the present disclosure, there is provided a barrier laminate as described herein, wherein the multilayer structure has thickness in the range of 20 μm to 150 μm.

In an embodiment of the present disclosure, there is provided a barrier laminate as described herein, wherein the ethylene vinyl alcohol layer is a multilayer structure and comprises at least one layer selected from polyolefin layer, tie layer, or combinations thereof.

In an embodiment of the present disclosure, there is provided a barrier laminate as described herein, wherein the tie layer is selected from the group consisting of maleated polyethylene, anhydride grafted ethylene/1-butene copolymer, anhydride grafted ethylene/1-hexene copolymer, propylene ethylene copolymer, ethylene vinyl acetate copolymer, ethylene methyl acrylate copolymer, and anhydride grafted ethylene/1-octene copolymer.

In an embodiment of the present disclosure, there is provided a barrier laminate as described herein, wherein the tie layer has a thickness in the range of 2 μm-25 μm.

In an embodiment of the present disclosure, there is provided a barrier laminate as described herein further comprises at least one intermediate layer selected from primer layer, adhesive layer, or combinations thereof.

In an embodiment of the present disclosure, there is provided a barrier laminate as described herein, wherein the primer layer is polyethylene imine.

In an embodiment of the present disclosure, there is provided a barrier laminate as described herein, wherein the adhesive layer is polyurethane adhesive.

In an embodiment of the present disclosure, there is provided a barrier laminate as described herein, wherein the at least one primer layer has a coating thickness in the range of 0.01 gsm to 0.08 gsm.

In an embodiment of the present disclosure, there is provided a barrier laminate as described herein, wherein the at least one polyolefin core layer (X) is a monolayer or multilayer.

In an embodiment of the present disclosure, there is provided a barrier laminate as described herein, wherein the at least one polyolefin core layer (X) comprises polymer having density in the range of 0.833 $g/cm^3$-0.99 $g/cm^3$.

In an embodiment of the present disclosure, there is provided a barrier laminate as described herein, wherein the at least one polyolefin core layer is selected from a group consisting of high density polyethylene, medium density polyethylene, low density polyethylene, linear low density polyethylene, polypropylene, propylene copolymers, ethylene copolymers, polymethyl pentene, and combinations thereof. In an alternate embodiment of the present disclosure, wherein the at least one polyolefin core layer is selected from a group consisting of high density polyethylene, medium density polyethylene, linear low density polyethylene, polypropylene, propylene copolymers, ethylene copolymers, polymethyl pentene, and combinations thereof. In yet another embodiment of the present disclosure, wherein the at least one polyolefin core layer is selected from a group consisting of high density polyethylene, medium density polyethylene, linear low density polyethylene, a combination of low density polyethylene and high density polyethylene, and combinations thereof.

In an embodiment of the present disclosure, there is provided a barrier laminate as described herein, wherein the at least one polyolefin core layer (X) has a thickness in the range of 1 μm-250 μm.

In an embodiment of the present disclosure, there is provided a barrier laminate as described herein, wherein the at least one polyolefin layer (Z) comprises polymer having density in the range of 0.833 $g/cm^3$-0.990 $g/cm^3$.

In an embodiment of the present disclosure, there is provided a barrier laminate as described herein, wherein the at least one polyolefin layer (Z) has a thickness in the range of 3 μm-200 μm.

In an embodiment of the present disclosure, there is provided a barrier laminate as described herein, wherein the at least one polyolefin layer (Z) is monolayer or multilayer.

In an embodiment of the present disclosure, there is provided a barrier laminate as described herein, wherein the laminate has a thickness in the range of 10 μm-400 μm.

In an embodiment of the present disclosure, there is provided a barrier laminate as described herein, wherein the film has an oxygen transmission rate (OTR) equal to or less than 0.05 $cm^3/m^2$/1 day/1 atm, at a temperature in the range of 22° C.-25° C. at relative humidity in the range of 0-90% RH.

In an embodiment of the present disclosure, there is provided a barrier laminate as described herein, wherein the laminate reduces the oxygen transmission rate (OTR) by 2-15 times from the normal 0.3 to 0.5 $cc/m^2$. day.

In an embodiment of the present disclosure, there is provided a barrier laminate as described herein, wherein the laminate has an oxygen transmission rate (OTR) equal to or less than 0.05 $cm^3/m^2$/1 day/1 atm, at a temperature in the range of 22° C.-25° C. at relative humidity in the range of 0-90% RH.

In an embodiment of the present disclosure, there is provided a process of preparing the barrier laminate as described herein, wherein the laminate is prepared by a process selected from blown film process, cast film process, and extrusion lamination of blown or cast films.

In an embodiment of the present disclosure, there is provided a process of preparing the barrier laminate as described herein, wherein the laminate is prepared by a process selected from blown film process, cast film process, and adhesive lamination of blown or cast films.

In an embodiment of the present disclosure, there is provided an article comprising the barrier laminate as described herein.

In an embodiment of the present disclosure, there is provided a use of the barrier laminate as described herein for a packaging material. The barrier laminate may be used in making the inner barrier liners (IBL), shoulder barrier liners (SBL), lami-tube, or a packaging material. The barrier laminate of the present disclosure may be used as an inner barrier liner (IBL) in a packaging material or the shoulder barrier liner (SBL) of packaging material or the sleeve of a packaging material or top seal of a packaging material. The IBL/SBL/Top seal works as an effective moisture and oxygen barrier for packaging products which are environmentally sensitive. The packaging may be a lami-tube.

In an embodiment of the present disclosure, there is provided a use as described herein, wherein packaging material is a lamitube, shoulder barrier liner, or inner barrier liner of a tube.

Figure 1:
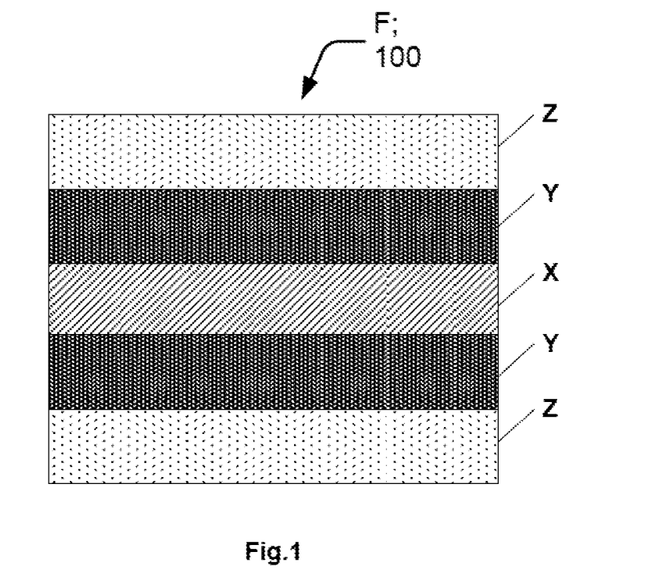
FIG. 1 illustrates a cross-section of a barrier laminate (F; 100), according to an implementation of the present disclosure.

Referring specifically to the drawings, in FIG. 1, a schematic cross section of the barrier laminate F of the present disclosure is shown. The barrier laminate 100 has the generalized structure Z/Y/X/Y/Z, wherein Z is the polyolefin layer, Y is the barrier layer and X is the polyolefin core layer. The polyolefin layer, the barrier layer and the polyolefin core layer are as described in the previous paragraphs. The barrier layer Y may be a PVOH coating or EVOH barrier layer. The EVOH barrier layer may be a monolayer structure or a multilayer having structure selected from, A/T/B/T/A, A/T/B/T/B/T/A, A/T/B/B/B/T/A, A/A/T/B/T/B/T/A/A, or A/A/T/B/B/B/T/A/A wherein A is polyolefin layer, T is tie layer, and B is EVOH layer.

In an example, the FIG. 1 represent the barrier laminate structure: at least one polyethylene layer/PVOH coating/at least one polyolefin core layer/PVOH coating/at least one polyethylene layer.

In another example, the FIG. 1 represents the barrier laminate structure: at least one polyethylene layer/PVOH coating/at least one polyolefin core layer/EVOH barrier layer/at least one polyethylene layer. The EVOH barrier layer may be a monolayer as shown in FIG. 1 or a multilayer having structure selected from PE/EVOH/PE, PE/Tie layer/EVOH/Tie layer/PE, or PE/Tie layer/EVOH/Tie layer/EVOH/Tie layer/PE, PE/Tie layer/EVOH/Nylon/EVOH/Tie layer/PE.

Figure 2:
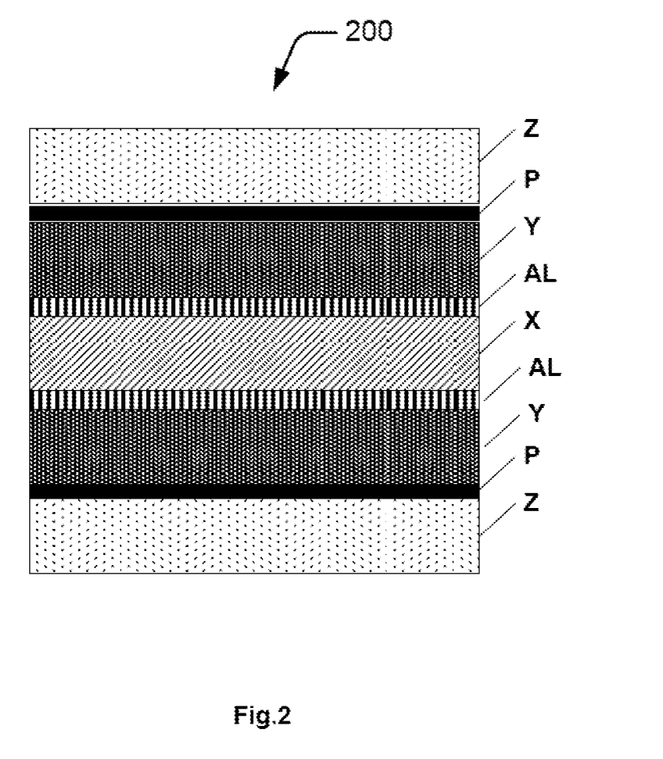
FIG. 2 illustrates a cross-section of barrier laminate (F; 200) comprising adhesive layers, according to an implementation of the present disclosure.
Figure 3:
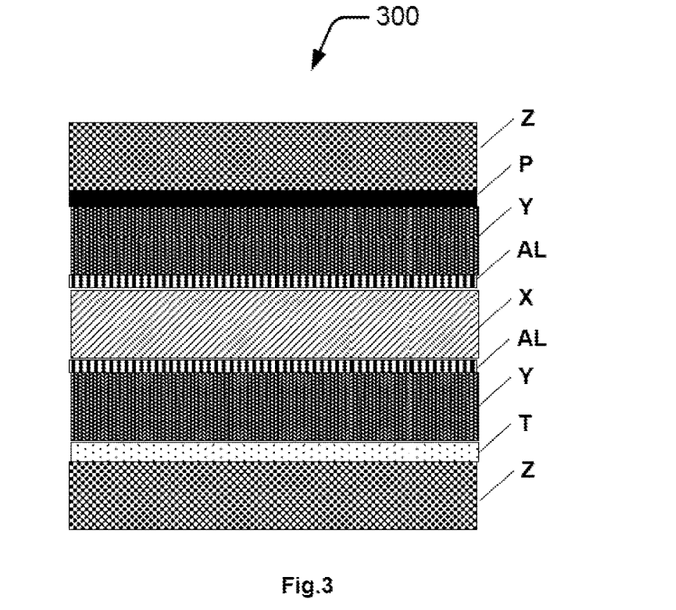
FIG. 3 illustrates a cross-section of a barrier laminate (300) comprising a combination of PVOH coating and EVOH barrier layer, according to an implementation of the present disclosure.
Figure 4:
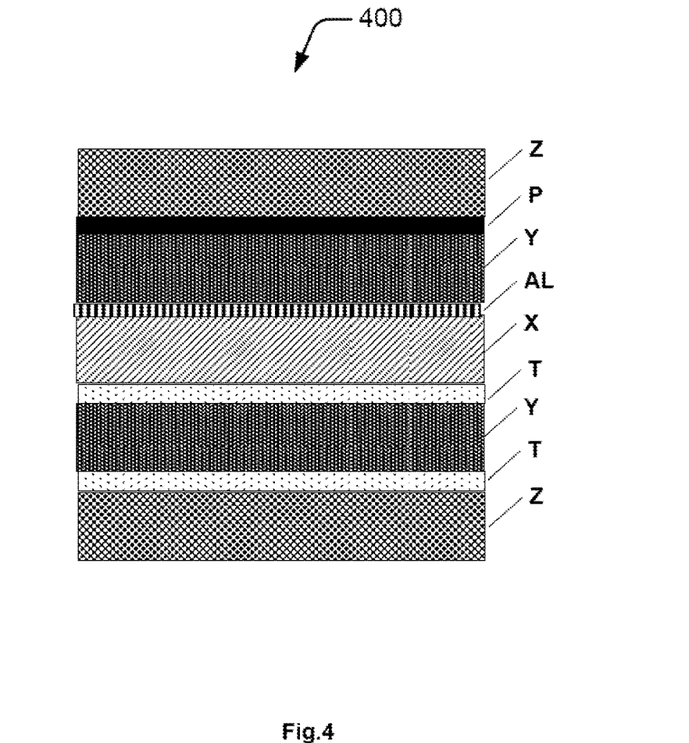
FIG. 4 illustrates a cross-section of barrier laminate (400) comprising combination of PVOH coating and EVOH barrier layer having the tie layer and adhesive layer, according to an implementation of the present disclosure.

In FIG. 2, a schematic cross section of another embodiment of the barrier laminate of the present disclosure is generally shown. The barrier laminate 200 has the structure of Z/P/Y/AL/X/AL/Y/P/Z, wherein Z is the polyethylene layer, P is a primer layer, Y is the barrier layer and X is the polyolefin core layer, AL is an adhesive layer In FIG. 3, a schematic cross section of another embodiment of the barrier laminate of the present disclosure is shown. The barrier laminate 300 has the generalized structure of Z/P/Y/AL/X/AL/Y/T/Z wherein Z is the polyethylene layer, A is a primer layer, Y is the barrier layer, X is the polyolefin core layer, and T is at least one tie layer, AL is adhesive layer In FIG. 4, a schematic cross section of another embodiment of the barrier laminate of the present disclosure is shown. The barrier laminate 400 has the generalized structure of Z/P/Y/AL/X/T/Y/T/Z. It comprises a combination of PVOH adhesive coating and EVOH barrier layer having tie layer and adhesive layer.

Although the subject matter has been described in considerable detail with reference to certain examples and implementations thereof, other implementations are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Abbreviations

MA-grafted tie layer: maleic anhydride grafted tie layer
EVOH: ethylene vinyl alcohol, wherein the ethylene content is 24-48 mol %.
PE Polyethylene
HDPE High density polyethylene
MDPE Medium density polyethylene
LDPE Low density Polyethylene
LLDPE Linear Low density Polyethylene
PVOH Polyvinyl alcohol
AL Adhesive layer
PL Primer layer Example 1

Process for Preparing a Barrier Laminate
Laminate 1
150 μm film PE (HDPE 60%+MDPE 40%) was made using blown film process and was coated with PVOH solution. Another three layer 150 μm film with same structure was made and two such films were adhesive laminated by polyurethane adhesive interposed by a 50 μm LLDPE layer to make the final Laminate 1.
Laminate 2
150 μm PE film (HDPE 60%+MDPE 40%) was made using blown film process and was coated with PVOH solution. Another three layer 150 μm film with same structure was made and two such films were adhesive laminated by polyurethane primer interposed by a 50 μm HDPE layer to make the final Laminate 2.
Laminate 3
A three layer 150μ PE film (60% HDPE+40% LDPE) was made using blown film process and was coated with PVOH solution. This film is adhesive laminated with 50 μm multilayer barrier (25 μm PE/6 μm Tie/3 μm EVOH/6 μm Tie/10

μm PE) having 3 μm EVOH. The PE of the multilayer barrier is made up of 60% HDPE+40% LDPE. The tie layer is maleated polyethylene.

Laminate 4

An 80 μm PE blown film (HDPE 70%+MDPE 30%) was coated with PVOH solution. The obtained film was extrusion laminated with 51 μm barrier layer (20 PE/5 Tie/11μ EVOH/5 Tie/10 PE]) having 11 μm EVOH, which was further extrusion laminated with a 50 μm PE (60% HDPE+ 40% LDPE).

For the laminates explained in the Example 1, i.e, Laminate 1, Laminate 2, Laminate 3, and Laminate 4, the thickness of PVOH adhesive coating is of 0.5 gsm.

Comparative Laminate 1

A three layer 150 μm PE film (HDPE 60%+MDPE 40%) was made using blown film process and was coated with PVOH solution. Another three layer 150 μm film with same structure was made and two such films were adhesive laminated to make the comparative Laminate 1.

Laminate 5

A three layer 150 μm PE film (HDPE 60%+MDPE 40%) was made using blown film process and was coated with PVOH solution. Another three layer 150 μm film with same structure was made and two such films were extrusion laminated by a 50 μm LDPE layer to make the Laminate 5.

Example 2

Barrier Properties of the Barrier Laminate of the Present Disclosure

A series of tests were conducted on the various laminate prepared by the process as explained in Example 1. The test condition used for conduction the OTR test are in Table 1 below:

TABLE 1

| Test Condition | For OTR testing |
| --- | --- |
| Standard Used | ASTM D 3985-05 |
| Room Temp. | 22 +/− 2° C. |
| Test Temp. | 23 +/− 0.5° C. |
| Test RH | 0% +/− 3% RH |
| Carrier RH | 0% +/− 3% RH |
| Conditioning | 1 Hr |
| Test Area | 50 cm$^2$ |
| Machine Model | MOCON OTR 2/22-L |

The OTR results of various barrier laminates are recorded in Table 2. The purpose of these tests was to demonstrate that the OTR varies if a single barrier layer is used in the laminate in comparison to a laminate wherein the two barrier layers are used separated by a polyolefin core layer. The structure and design of the barrier laminate of the present disclosure provided enhanced barrier properties and the same was confirmed by the extremely low oxygen transmission rate (OTR) values.

TABLE 2

Oxygen Transmission Rates of barrier laminates of the present disclosure

| Laminate | Example | OTR (cc/m2-day) A cell | B cell |
| --- | --- | --- | --- |
| 150 μm PE(HDPE 60% + MDPE 40%)/PVOH/Adhesive/PVOH/150 μ PE (HDPE 60% + MDPE 40%) | Comparative laminate-1 | 0.34 | 0.3 |
| 150 μm PE(HDPE 60% + MDPE 40%)/PVOH(barrier layer)//50 μm LDPE (polyolefin core layer)//PVOH/150 μm PE(HDPE 60% + MDPE 40%) | Laminate 5 | 0.26 | 0.1 |
| 150 μm PE (HDPE 60% + MDPE 40%)/PVOH(barrier layer)/Adhesive/50 μm LLDPE(polyolefin core layer)/Adhesive/PVOH(barrier layer)/150 μm PE(HDPE 60% + MDPE 40%) | Laminate 1 | 0.08 | 0.1 |
| 150 μm PE(HDPE 60% + MDPE 40%)/PVOH(barrier layer)/Adhesive/50 μm HDPE(polyolefin core layer)/Adhesive/PVOH(barrier layer)/150 μm PE (HDPE 60% + MDPE 40%) | Laminate 2 | 0.04 | 0.08 |
| 150 μm PE(60% HDPE + 40% LDPE)/PVOH(barrier layer)/50 μm layer [25 μm PE (polyolefin core layer; 60% HDPE + 40% LDPE)/6 μm Tie/3 μm EVOH(barrier layer)/6 μm Tie/10 μm PE(60% HDPE + 40% LDPE)] | Laminate 3 | 0.02 | 0.02 |
| 80 μ PE(HDPE 70% + MDPE 30%)/PVOH/20 μ Tie/51 μm layer [20 μm PE(polyolefin core layer)/5 μm Tie/11 μm EVOH (barrier layer)/5 μm Tie/10 μm PE(HDPE 70% + MDPE 30%)]/20 μ Tie/50 μm PE (HDPE 70% + MDPE 30%) | Laminate 4 | 0.02 | 0.02 |

Table 2 illustrates that when a single barrier layer was used in the barrier laminate an OTR value of 0.34 was attained (Comparative laminate 1). In contrast, if the single barrier layer was replaced by two barrier layers separated by a polyolefin core layer, such a barrier laminate (Laminate 1, Laminate 2, Laminate 3, and Laminate 4) showed extremely low oxygen transmission rate (OTR) values in comparison to the Comparative laminate 1. It can thus be inferred that the presence of the polyolefin core layer (and having two barrier layers of similar thickness, resulted in the enhancement of barrier properties, i.e., unexpected low OTR values.

From the above explanation splitting the barrier layer into two layers creates structural and physical improvements in terms of barrier properties in the laminates. Referring to the Laminate 2, Laminate 1, Laminate 5, Laminate 3, and Laminate 4, if a comparison is drawn between an individual PVOH adhesive coating and PVOH adhesive coating layers separated by a low density polyethylene (LDPE), linear low density polyethylene (LLDPE), and high density polyethylene layer (HDPE), it was surprisingly observed that the laminate with linear low density polyethylene, and high density polyethylene as the core layer resulted in improved barrier properties.

From the above Table 2 it is discernible, that replacing a single barrier layer of certain thickness with two barrier layers separated by a polyolefin core layer results in a laminate with enhanced barrier properties, i. e., reduction of approximately at least 2-15 times was observed in the OTR in comparison to the standard barrier laminates comprising single barrier layer of similar thickness at a temperature in the range of 22° C.-25° C. at relative humidity in the range of 0-90% RH. The polyolefin core layer may be a single layer or multiple layers having thickness in the range of 1-100 The constituents of the polyolefin core layer may be selected from the group consisting of high density polyethylene, linear low density polyethylene, polypropylene, polypropylene copolymers, a combination of high density polyethylene and low density polyethylene, and combinations thereof.

Advantages of the Present Disclosure

The barrier laminate of the present disclosure provides enhanced barrier properties. The structure of the laminate is such that a low OTR is achieved at a temperature in the range of 22° C.-25° C. at relative humidity in the range of 0-90% RH.

The design of the barrier laminate enhances economic value compared to commercial films and help in achieving multilayer film design with lesser film thickness yet higher barrier properties.

Although the subject matter has been described in considerable detail with reference to certain examples of the barrier laminates and implementations, such as fabrication into useful articles and uses of these articles. Other implementations are possible. Those skilled in the art will appreciate that numerous modifications to these embodiments may be made without departing from the scope of the invention. For example, while certain specific layer compositions, including certain adhesives and tie layers within those layers, and certain layer arrangements of the laminate are exemplified, other compositions and arrangements are also contemplated. Additionally, while packaging, labeling and imaging are included among the uses for the inventive laminates, other uses are also contemplated. As such, the spirit and scope of the appended claims should not be limited to the description of the preferred examples and implementations contained therein.

We claim:
1. A barrier laminate consisting of:
at least one polyolefin core layer selected from the group consisting of high density polyethylene, medium density polyethylene, linear low density polyethylene, ethylene copolymers, polymethyl pentene, and combinations thereof;
a first barrier layer joined to a first side of the at least one polyolefin core layer; and
at least one polyolefin layer adjacent to the first barrier layer,
a second barrier layer joined to a second side of the at least one polyolefin core layer,
wherein the first barrier layer on the first side of the at least one polyolefin core layer is a polyvinyl alcohol (PVOH) coating layer, and has a coating thickness in the range of 0.1 gsm-1.5 gsm,
wherein the barrier laminate is prepared by a blown film process, and
wherein the barrier laminate reduces an oxygen transmission rate (OTR) by 2-15 times of 0.3 to 0.5 cc/m2/day.

2. The barrier laminate as claimed in claim 1, wherein the second barrier layer is selected from a polyvinyl alcohol coating layer, an ethylene vinyl alcohol layer, a nylon layer, or combinations thereof.

3. The barrier laminate as claimed in claim 2, wherein the ethylene vinyl alcohol layer is a multilayer structure having 5-9 layers.

4. The barrier laminate as claimed in claim 3, wherein the multilayer structure has a thickness in the range of 20 μm to 150 μm.

5. The barrier laminate as claimed in claim 3, wherein the multilayer structure comprises at least one layer selected from a polyolefin layer, a tie layer, or combinations thereof.

6. The barrier laminate as claimed in claim 5, wherein the tie layer is selected from the group consisting of maleated polyethylene, anhydride grafted ethylene/1-butene copolymer, anhydride grafted ethylene/1-hexene copolymer, propylene ethylene copolymer, ethylene vinyl acetate copolymer, ethylene methyl acrylate copolymer, and anhydride grafted ethylene/1-octene copolymer.

7. The barrier laminate as claimed in claim 5, wherein the tie layer has a thickness in the range of 2 μm-25 μm.

8. The barrier laminate as claimed in claim 1, wherein the laminate further comprises at least one intermediate layer selected from a primer layer, an adhesive layer, or combinations thereof.

9. The barrier laminate as claimed in claim 8, wherein the primer layer is polyethylene imine, and the adhesive layer is polyurethane adhesive.

10. The barrier laminate as claimed in claim 1, wherein the at least one polyolefin core layer is a monolayer or multilayer.

11. The barrier laminate as claimed in claim 1, wherein the at least one polyolefin core layer comprises polymer having a density in the range of 0.833 $g/cm^3$-0.99 $g/cm^3$.

12. The barrier laminate as claimed in claim 1, wherein the at least one polyolefin core layer has a thickness in the range of 1 μm-250 μm.

13. The barrier laminate as claimed in claim 1, wherein the at least one polyolefin layer comprises polymer having a density in the range of 0.833 $g/cm^3$-0.990 $g/cm^3$.

14. The barrier laminate as claimed in claim 1, wherein the at least one polyolefin layer has a thickness in the range of 3 μm-200 μm.

15. The barrier laminate as claimed in claim 1, wherein the at least one polyolefin layer is a monolayer or multilayer.

16. The barrier laminate as claimed in claim 1, wherein the laminate has a thickness in the range of 10 μm-400 μm.

17. The barrier laminate as claimed in claim 1, wherein the laminate has an oxygen transmission rate (OTR) equal to or less than 0.05 cm$^3$/m$^2$/1 day/1 atm, at a temperature in the range of 22° C.-25° C. at a relative humidity in the range of 0-90% RH.

18. An article comprising the barrier laminate as claimed in claim 1.

19. A method of preparing a packaging material, comprising forming the barrier laminate as claimed in claim 1 into the packaging material.

20. The method claimed in claim 19, wherein the packaging material is a lamitube, shoulder barrier liner, or inner barrier liner of a tube.

21. A barrier laminate comprising:
   a polyolefin core layer selected from the group consisting of high density polyethylene, medium density polyethylene, linear low density polyethylene, ethylene copolymers, polymethyl pentene, and combinations thereof, the polyolefin core layer having a first side and a second side opposite to the first side;
   a first barrier layer disposed on the first side of the polyolefin core layer;
   a second barrier layer disposed on the second side of the polyolefin core layer; and
   a first polyolefin layer disposed on at least one of the first barrier layer and the second barrier layer,
   wherein the first barrier layer is a polyvinyl alcohol (PVOH) coating layer, and the first barrier layer has a coating thickness in the range of 0.1 gsm-1.5 gsm.

22. The barrier laminate of claim 21, wherein the first barrier layer is disposed directly on the first side of the polyolefin core layer,
   wherein the second barrier layer is disposed directly on the second side of the polyolefin core layer,
   wherein the first polyolefin layer is disposed directly on the first barrier layer, the barrier laminate further comprising:
   a second polyolefin layer disposed directly on the second barrier layer.

23. The barrier laminate of claim 21, wherein the first polyolefin layer is disposed on the first barrier layer, the barrier laminate further comprising:
   a first adhesive layer between the polyolefin core layer and the first barrier layer;
   a second adhesive layer between the polyolefin core layer and the second barrier layer;
   a second polyolefin layer disposed on the second barrier layer;
   a first primer layer between the first barrier layer and the first polyolefin layer; and
   a second primer layer between the second barrier layer and the second polyolefin layer.

24. The barrier laminate of claim 23, further comprising:
   a tie layer between the second barrier layer and the second polyolefin layer or between the second barrier layer and the polyolefin core layer, or both.

* * * * *